United States Patent
Gonser et al.

(10) Patent No.: US 10,841,439 B2
(45) Date of Patent: *Nov. 17, 2020

(54) MOBILE SOLUTION FOR IMPORTING AND SIGNING THIRD-PARTY ELECTRONIC SIGNATURE DOCUMENTS

(71) Applicant: DocuSign, Inc., San Francisco, CA (US)

(72) Inventors: Thomas H. Gonser, Alamo, CA (US); Donald Grant Peterson, Kirkland, WA (US)

(73) Assignee: DocuSign, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,249

(22) Filed: Nov. 6, 2019

(65) Prior Publication Data

US 2020/0092430 A1 Mar. 19, 2020

Related U.S. Application Data

(63) Continuation of application No. 13/662,173, filed on Oct. 26, 2012, now Pat. No. 10,511,732, which is a continuation-in-part of application No. 13/595,876, filed on Aug. 27, 2012, now Pat. No. 8,838,980.

(60) Provisional application No. 61/552,359, filed on Oct. 27, 2011, provisional application No. 61/527,406, filed on Aug. 25, 2011.

(51) Int. Cl.
*H04L 29/06* (2006.01)
*H04N 1/00* (2006.01)
*H04N 1/44* (2006.01)
*H04N 1/32* (2006.01)
*H04N 1/21* (2006.01)

(52) U.S. Cl.
CPC ..... *H04N 1/00424* (2013.01); *H04N 1/00448* (2013.01); *H04N 1/00472* (2013.01); *H04N 1/00474* (2013.01); *H04N 1/2187* (2013.01); *H04N 1/2191* (2013.01); *H04N 1/32112* (2013.01); *H04N 1/4413* (2013.01); *H04N 2201/3233* (2013.01)

(58) Field of Classification Search
CPC .................................................. H04N 1/00424
See application file for complete search history.

(56) References Cited

U.S. PATENT DOCUMENTS 6,553,494 B1 * 4/2003 Glass ............... G06F 21/32
713/176
7,100,045 B2 * 8/2006 Yamada ............... H04L 9/321
713/156

(Continued)

*Primary Examiner* — Harris C Wang
(74) *Attorney, Agent, or Firm* — Fenwick & West LLP

(57) ABSTRACT

Techniques for signer-initiated electronic document signing via an electronic signature service using a mobile or other client device are described. Example embodiments provide an electronic signature service ("ESS") configured to facilitate the creation, storage, and management of documents and corresponding electronic signatures. In some embodiments, when a signer user receives a hard copy (e.g., paper) signature document, the signer may capture an image of the signature document with a camera of a mobile device. The signer can then import the captured image into the ESS for signature, storage, and/or transmission to other parties.

20 Claims, 8 Drawing Sheets

(56) References Cited

U.S. PATENT DOCUMENTS

| | | | | |
|---|---|---|---|---|
| 7,395,503 | B1* | 7/2008 | Pravetz | G06F 40/166 |
| | | | | 715/268 |
| 7,568,104 | B2* | 7/2009 | Berryman | G06F 21/64 |
| | | | | 713/150 |
| 8,588,483 | B2* | 11/2013 | Hicks | G06K 9/00161 |
| | | | | 382/119 |
| 2002/0004800 | A1* | 1/2002 | Kikuta | H04L 9/3231 |
| | | | | 715/255 |
| 2002/0040431 | A1* | 4/2002 | Kato | G06F 21/64 |
| | | | | 713/168 |
| 2002/0069179 | A1* | 6/2002 | Slater | G06Q 20/10 |
| | | | | 705/67 |
| 2002/0143711 | A1* | 10/2002 | Nassiri | G06Q 20/3821 |
| | | | | 705/76 |
| 2006/0041605 | A1* | 2/2006 | King | G06F 16/93 |
| 2012/0190405 | A1* | 7/2012 | Kumaran | G06F 21/64 |
| | | | | 455/556.2 |
| 2013/0159720 | A1* | 6/2013 | Gonser | G06F 21/32 |
| | | | | 713/176 |

* cited by examiner

230

Sign

Drag and drop tags. Select Finish when you are ready.

+ Add  Finish  More Options  ← 231

Non-Disclosure Agreement  233

This Agreement is entered into on this _____ day of _____ by and between _____ (the Disclosing Party), located at _____ and with _____ (the Recipient), located at _____.

The Recipient hereto desires to participate in discussions regarding _____ ....

232
- Signature
- Initial
- My Name
- Date Signed
- Text
- Checkbox

234
Sign Here:
X _____

My Docs  Capture  Identity  More

*Fig. 2E*

MOBILE SOLUTION FOR IMPORTING AND SIGNING THIRD-PARTY ELECTRONIC SIGNATURE DOCUMENTS

PRIORITY CLAIM

This application is a continuation of U.S. application Ser. No. 13/662,173, filed Oct. 26, 2012, which claims the benefit of U.S. Provisional Application Ser. No. 61/552,359, filed Oct. 27, 2011. U.S. application Ser. No. 13/662,173 is also a continuation-in-part of U.S. patent application Ser. No. 13/595,876, filed Aug. 27, 2012, now U.S. Pat. No. 8,838,980, which claims the benefit of U.S. Provisional Application Ser. No. 61/527,406, filed Aug. 25, 2011, all of which are incorporated by reference in their entirety.

FIELD OF THE INVENTION

The present disclosure relates to methods and systems for electronic signatures and, more particularly, to methods and systems to facilitate signer-initiated electronic document signing using a mobile or other client device, such as by capturing an image of a document with a camera of the mobile device, and then importing the image as an electronic signature document into an electronic signature service for signature and storage.

BACKGROUND

One existing approach to electronic signatures provides an electronic signature "stamping" application for a mobile device. The signature application allows a user to open a document sent to them for signing and "stamp" a signature or other data into the document and return this by email. This approach suffers from a number of drawbacks. As one example, it only works with specific software applications for mobile devices, and the signing process is performed entirely in software on the mobile device. As such, the document must be manually moved from the email message into the device, manipulated, and then returned back to the device for email delivery.

Also, to produce such an application for multiple devices or platforms requires that a largely redundant application be built for every platform, and then only for those platforms that have enough capability to actually manipulate PDFs. Not all platforms or devices can actually handle tasks like conversion of files, presentation of files, managing signature capture and placement and security. The inability of mobile devices to universally perform all such required functions severely limits the expansion of electronic signature services, particularly in the mobile device context.

Furthermore, such an application does not handle the case where a user receives a hard copy of a document. For example, if a user receives a paper copy of an agreement, there is no convenient way for the user to import that document into his mobile device and attach an electronic signature. The inability for mobile devices to handle physical documents further limits the expansion of electronic signature services.

BRIEF DESCRIPTION OF THE DRAWINGS

Preferred and alternative examples of the present invention are described in detail below with reference to the following drawings:

FIGS. 2A-2E illustrate user interface screens according to example embodiments;

DETAILED DESCRIPTION

Embodiments described herein provide enhanced computer- and network-based methods and systems for mobile and other client devices to facilitate electronic document signing. Example embodiments provide an electronic signature service ("ESS") configured to facilitate the creation, storage, and management of documents and corresponding electronic signatures. Using at least some of the techniques described herein, a user (a "signer") can efficiently import a paper signature document into the ESS with a client device that has or is communicatively coupled to a camera or other image capture device (e.g., a scanner). First, the signer captures an image (e.g., taking a picture or photo) of the paper signature document. Then, using a browser or other client module executing on the client device, the signer can import the captured image into the ESS. The signer can further access, review, and sign the document via the mobile device, either before or after the document is imported into the ESS. After signing the document, the signer can use the client device to cause the ESS to provide access to the signed document to a recipient, such as by causing the ESS to email or otherwise transmit the signed document to the recipient.

Figure 1:
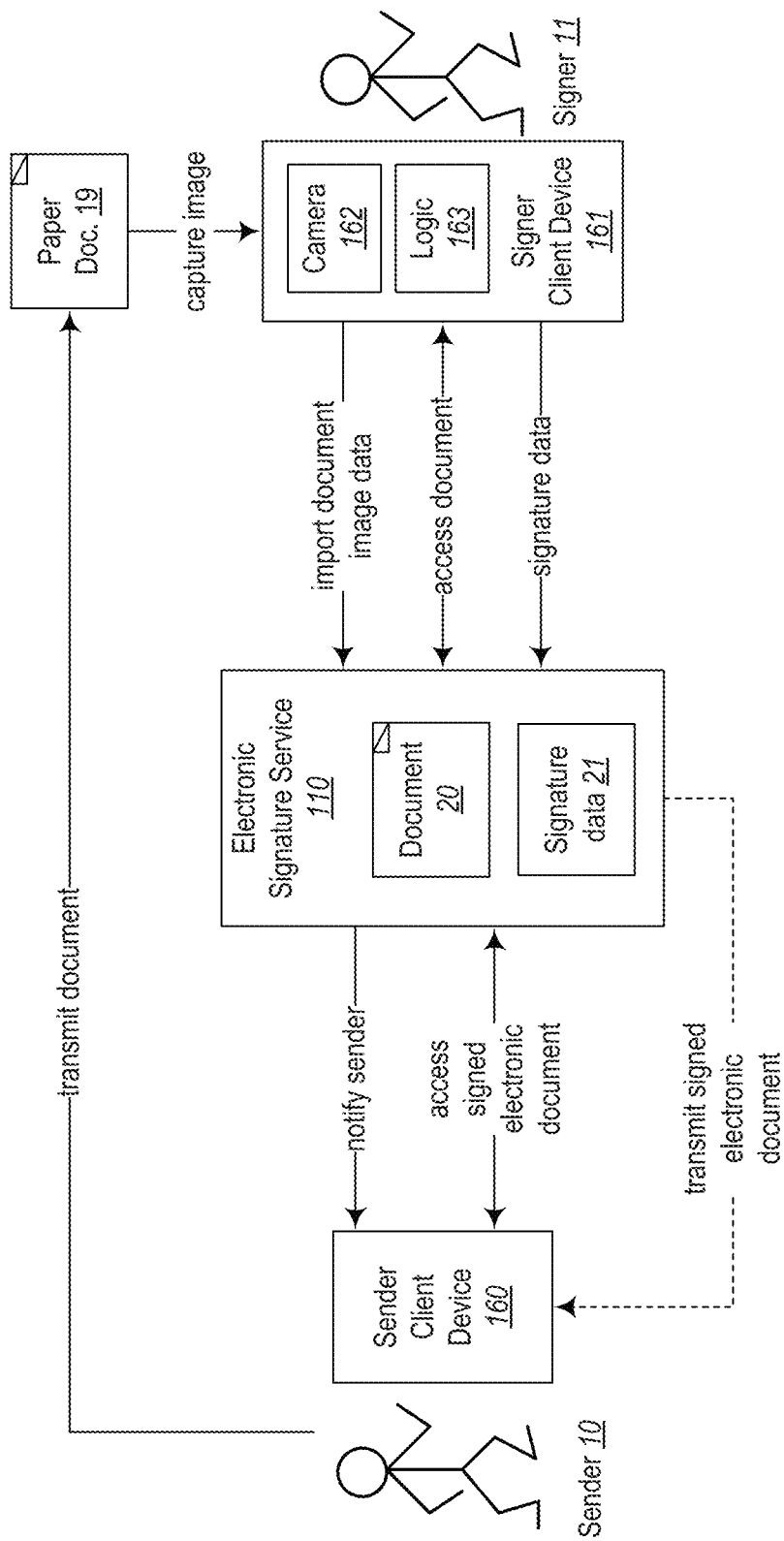
FIG. 1 illustrates an example block diagram of an example embodiment of an electronic signature service.

FIG. 1 illustrates an example block diagram of an example embodiment of an electronic signature service. In particular, FIG. 1 depicts an ESS 110 utilized by a sender user 10 and a signer user 11 to facilitate an electronic signing of a signature document.

In the illustrated scenario, the sender 10 transmits a document (e.g., a contract or agreement) to the signer 11, where it is received as paper document 19. Transmitting the document may include sending the document through the mail or courier service. In other embodiments, the document may be transmitted at least in part in electronic form, such as by transmitting the document via a facsimile machine/network (not shown) to the signer 11, where it is reproduced as the paper document 19. As another example, the sender 10 may utilize a sender client device 160 to send an email with the document included as an attachment to the email. The transmitted document may be in any format, such as PDF, Microsoft Word, HTML, text, or the like. Upon receipt of the email or electronic transmission, the signer 11 or some other party then prints the transmitted document as paper document 19.

The signer 11 may then use the signer client device 161 to import the document into the ESS 110. In the illustrated embodiment, the signer client device 161 includes a camera 162 and client logic 163 (e.g., a Web browser, email reader, a plug in, a mobile application). In other embodiments, the signer client device 161 is communicatively coupled to a separate camera or other input device (e.g., a scanner) operable to capture an image of the paper document 19. The signer 11 causes the client logic 163 to direct the camera 162 to capture an image of the paper document 19. The captured document image data is then stored or buffered in the signer client device 161 as a bit map, a compressed image (e.g., JPEG, GIF), PDF file, or the like. The signer 11 can then review the captured document image data (e.g., to determine image quality), modify the image data (e.g., by adding additional pages of the paper document 19 captured by the camera 162, by adding signature data), or the like.

When the user is satisfied that the paper document 19 has been successfully captured by the camera 162, the user causes the client logic 163 to import the document image data captured by the camera 162 to the ESS 110, where it is securely stored as electronic document 20. The ESS 110 may also convert the imported image data into a standard or preferred format for storage within the ESS 110. For example, if the captured image data was transmitted to the ESS 110 as a bit map or other image file, the data may be converted to or embedded within a PDF file by the ESS 110.

Once the document image data is imported into the ESS 110 and securely stored as document 20, the signer 11 can use the client device 161 to interact with the ESS 110 and perform various electronic signature-related operations. For example, the signer 11 can access and review the document by presenting and browsing the document using the logic 163, a browser, or some other client logic executing on the client device 161. Once the signer 11 has reviewed and/or modified the document to his satisfaction, he can provide signature data which is then securely stored by the ESS 110 as signature data 21 in association with the document 20. Note that in some embodiments, the signer 11 can provide signature data at an earlier time, such as after the document 19 has been captured by the camera 162, but before the captured image data is imported into the ESS 110. In such cases, the signature data may be transmitted from the signer client device 161 during (or at about the same time as) the import of the document image data into the ESS 110.

Once the signer 11 has signed the document 20, the signer 11 can cause the ESS 110 to provide access to the signed document 20 a recipient. For example, the signer 11 may return the signed document to the sender 10 or some other recipient. Different approaches to providing access to signed documents are contemplated. In the illustrated embodiment, the signer 11 can cause the ESS 110 to notify the sender 10, such as by causing the ESS 110 to transmit (e.g., in an email) a URL, link, or other identifier of the document 20 to the sender client device 160. The sender 10 can then use a browser or other client logic executing on the sender client device 160 to access the signed document on the ESS 110. Such an approach may be advantageous for sensitive documents which may preferably not be transmitted within an email or via some other possibly insecure transmission facility. In other embodiments, the ESS 110 can transmit the signed document 20 via an email, fax, or other transmission mechanism.

Note that the scenario described with respect to FIG. 1 may be modified in various ways. For example, different users may perform the import and signature operations described with respect to the signer 11 in FIG. 1. For example, a first user may use a client device (e.g., mobile phone) to capture an image of a signature document and then import the captured image into the ESS 110. The first user may then request (via the ESS 110) that a second user provide a signature, such as by causing the ESS 110 to send an email including a link that can be used by the second user to review and sign the stored electronic signature document.

Note also that at least some of the described techniques may be employed in a context where the client device does not include or otherwise use a camera. For example, the sender 10 may use the sender client device 160 to transmit a signature document (e.g., a contract or agreement) to the signer client device 161. For example, the sender 10 may transmit an email that includes a signature document (e.g., as an attachment or in the body of the email itself). Then, the signer 11 may use the logic 163 on the signer client device 161 to import the received signature document into the ESS 110 for secure storage and signature. In an email-based embodiment, the logic 163 may be or include a plug-in or extension to an email client or other type of email reader. As another example, the signer 11 may initially receive a signature document from a Web site, such as while accessing a Web site that originates or otherwise facilitates bank loans, credit card accounts, or the like. Upon receiving the document (e.g., in a Web browser of the signer client device 161), the signer 11 may use the logic 163 to import the document into the ESS 110 for secure storage and signature. In such an embodiment, the logic 163 may be or include a plug-in executing in the context of a Web browser.

The ESS 110 may provide other or additional functions. For example, the ESS 110 may provide or facilitate intelligent form-filling operations. In one embodiment, when the signer 11 repeatedly uses the ESS 110 to electronically sign documents, the ESS 110 tracks form data (e.g., names, addresses, telephone numbers) provided by the signer 11, such that forms within signature documents can be automatically populated with data elements, thereby increasing the efficiency of the signature process.

In some embodiments, the ESS 110 provides electronic identification ("ID") cards that represent user identities. An ID can include or operate as a container for information about a corresponding user, including personal information (e.g., name, address), a signature, security settings (e.g., regarding sharing of personal information). In some cases, the ESS 110 facilitates the creation of an ID for a user based on authentication information or credentials related to a social network (e.g., Facebook, Twitter) or other system (e.g., public email system). For example, the user may use credentials for his account on a social network (e.g., username and password) to establish an ID card managed by the ESS 110, thereby eliminating the need to create yet another set of credentials that are specific to the ESS 110.

Typically, the signer client device 161 is a mobile device, such as a smart phone, tablet computer, personal digital assistant, or the like. However, the techniques may be equally applied in other contexts and/or to other types of computing devices, including desktop computers, kiosk systems, and the like. In particular, some embodiments provide a module (e.g., plug-in, widget, extension) configured to perform some of the described techniques in the context of a desktop email client (e.g., Outlook), a hosted email service (e.g., Google Mail, Yahoo! Mail, Hotmail), or other application. In addition, the techniques may generally be deployed (e.g., as a signature module) in the context of any Web-based information or e-commerce service that has a need to obtain an electronic signature from a user (e.g., to obtain assent to terms and conditions, to enter into purchase/sale agreements, etc.).

In some embodiments, all or most of the above functions can be performed with a lightweight client (e.g., a Web browser) executing on the client device 161, such that no or minimal special purpose software need be installed on the client device 161 to perform or access the full spectrum of signature services provided by the ESS 110. In this manner, described techniques overcome many of the limitations of known approaches to facilitating electronic signatures on mobile devices. For example, in a known approach, a client must install a special purpose signature application (a "signature app") on a mobile phone to attach electronic signatures to documents. Unfortunately, this application is distinct from the email client on the mobile phone, such that the user must manually move a received document into the signature app, attach a signature, move the signed document back to the email client, and then transmit the signed document to a recipient. Such processing may be inefficient, cumbersome, and not user-friendly. Moreover, many signature apps do not include features such as document conversion, so they are unable to attach signatures to various common document formats. Furthermore, the diversity of mobile phone platforms (e.g., iPhone, Android, Blackberry) means developing and supporting distinct applications for each platform. The described techniques, on the other hand, are largely platform independent, as the core functionality is provided by the ESS 110, but accessed from diverse clients using standard Web browsers.

In addition, U.S. patent application Ser. No. 13/595,876, filed Aug. 27, 2012, and entitled "MOBILE SOLUTION FOR SIGNING AND RETAINING THIRD-PARTY DOCUMENTS," further describes embodiments of an ESS configured to facilitate electronic signatures via mobile or other client devices, and is incorporated by reference herein in its entirety. Techniques described herein may be used in combination with one or more of those described within U.S. patent application Ser. No. 13/595,876.

FIGS. 2A-2E illustrate user interface screens according to example embodiments. The illustrated user interface screens may be displayed by client software executing on a signer client device, such as the client logic 163 described above.

Figure 2A:
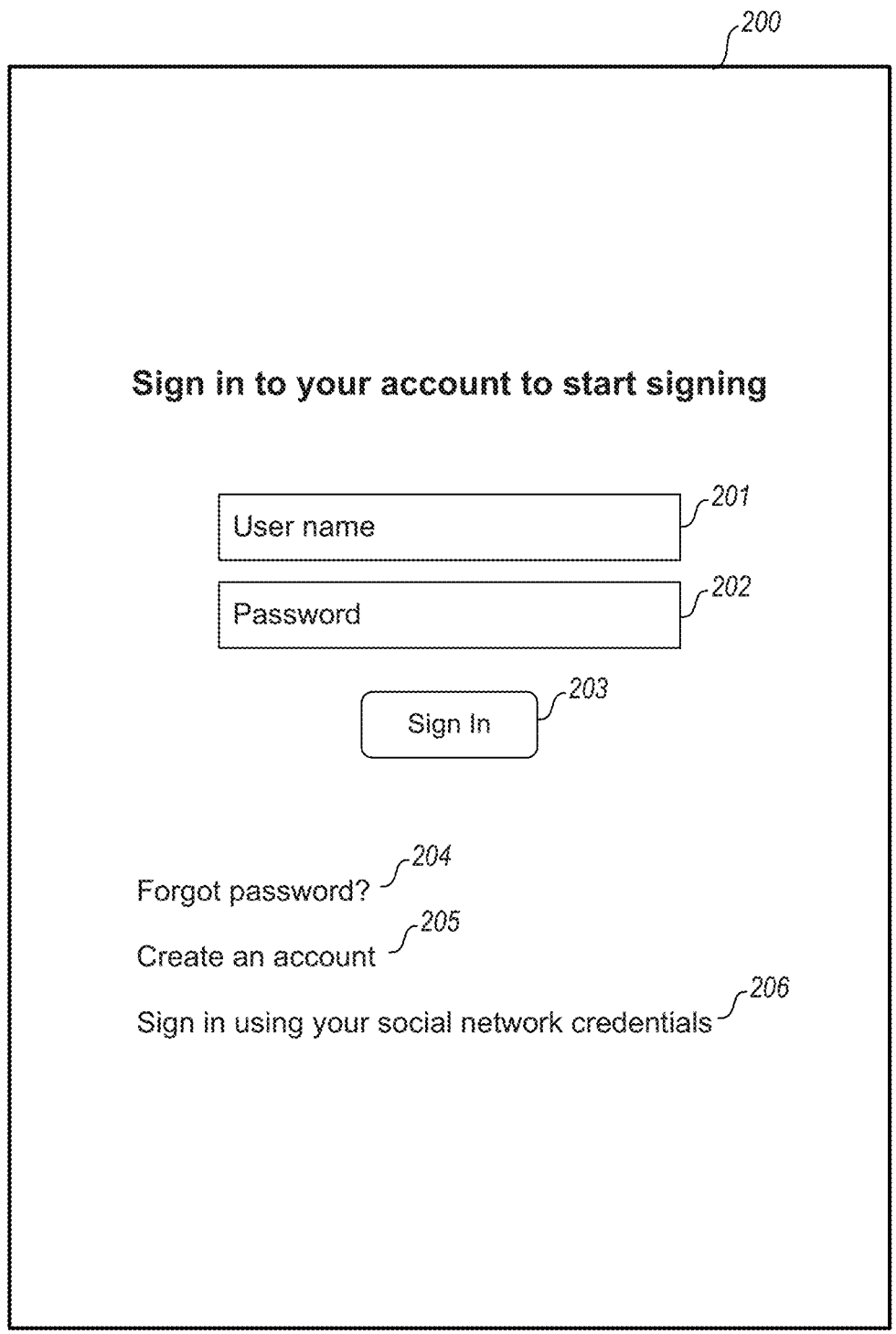

FIG. 2A illustrates a log in screen 200 presented by a client device operated by a signer or other user. The screen 200 may be provided by a mobile client device, such as a smart phone or tablet computer. In other embodiments, the screen 200 may be part of a file chooser/browser or desktop computing system. The screen 200 displays a user name entry control 201, a password entry control 202, and a sign in control 203. After the signer respectively provides a user name and password via controls 201 and 202, the signer selects control 203 to initiate an authenticated session with the ESS.

The screen 200 also includes controls (e.g. links) for recovering a forgotten password 204, creating a new account 205, or signing in using social network credentials 206. Upon selecting control 205, the signer will be brought to an account creation screen. The signer will be asked to enter their email address, name, a password, and a password confirmation, and to agree to the terms and conditions of the ESS. If all are successful, a new account will be created for the signer. In some embodiments, the signer will be sent an activation email that informs the signer that an account has been created and that requests that the signer click on an included link to activate the account.

Upon selection of control 206, the signer will be asked to provide their credentials for a social network (e.g., Facebook, Google+, Twitter) or other information service (e.g., a free online email service). If the user does not have an account with the ESS that is associated with the provided credentials, the user will be prompted to create an account, as discussed above. If the user does have an associated account with the ESS, an authenticated session will be initiated (provided the correct credentials are provided).

Figure 2B:
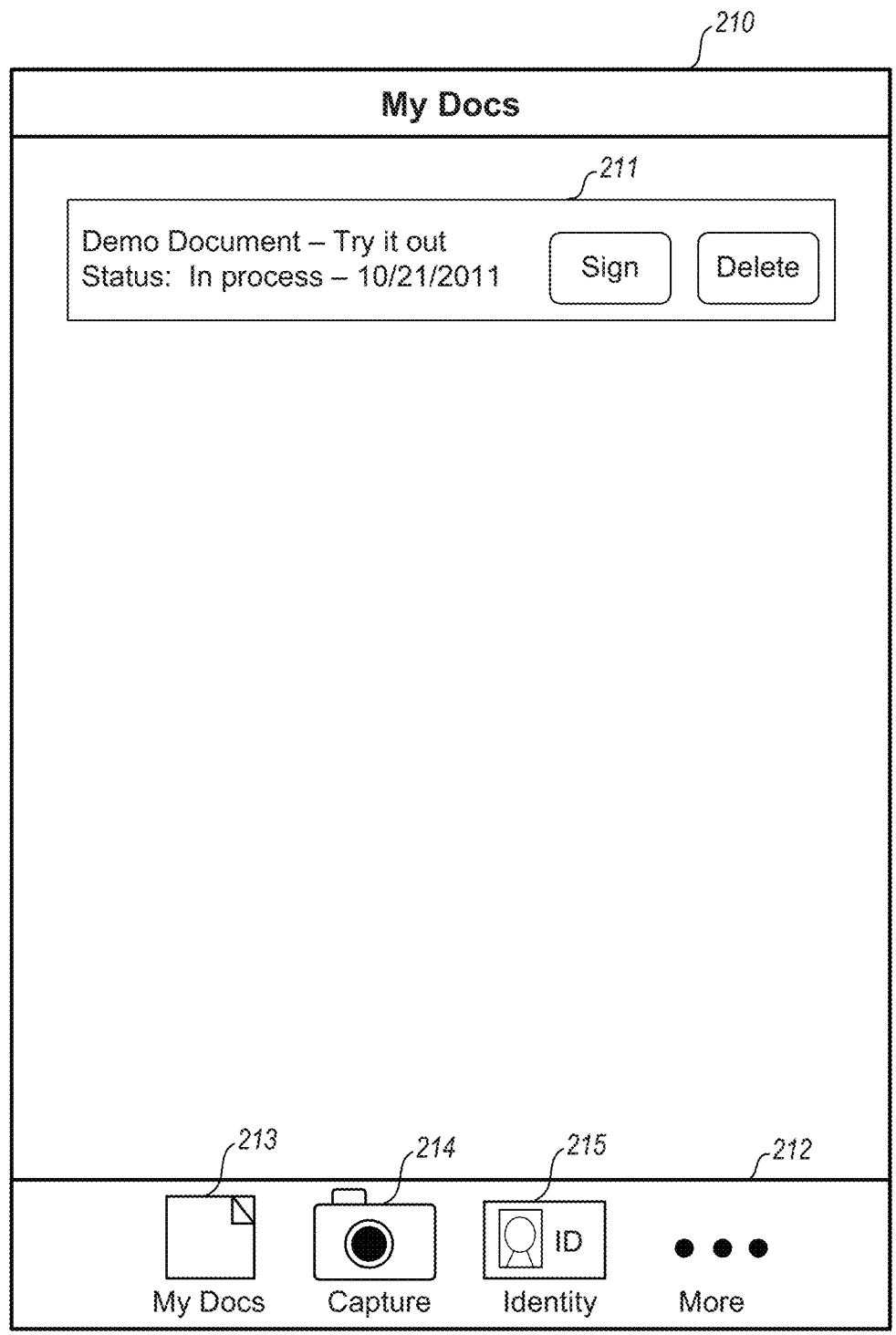

FIG. 2B illustrates a document browser screen 210. The screen 210 is typically displayed upon successful log in, as discussed above. The screen 210 displays indicators of documents available for signature on or via the client device. In the illustrated example, the screen 210 includes control 211, which identifies a document that is available for signature. The document may be stored on the client device or elsewhere (e.g., at the ESS). The control includes buttons for signing or deleting the corresponding document. If the user selects the sign button, a signature screen will be presented, as discussed with reference to FIG. 2E, below.

The screen 210 also includes a tabs control 212 that includes tabs for accessing different screens of the client software on the client device. The control 212 includes a My Docs tab 213 for accessing the screen 210, a Capture tab 214 for accessing an image capture screen 220 (FIGS. 2C and 2D), and an Identity tab 215 for managing an electronic ID card as discussed with reference to FIG. 1, above.

Figure 2C:
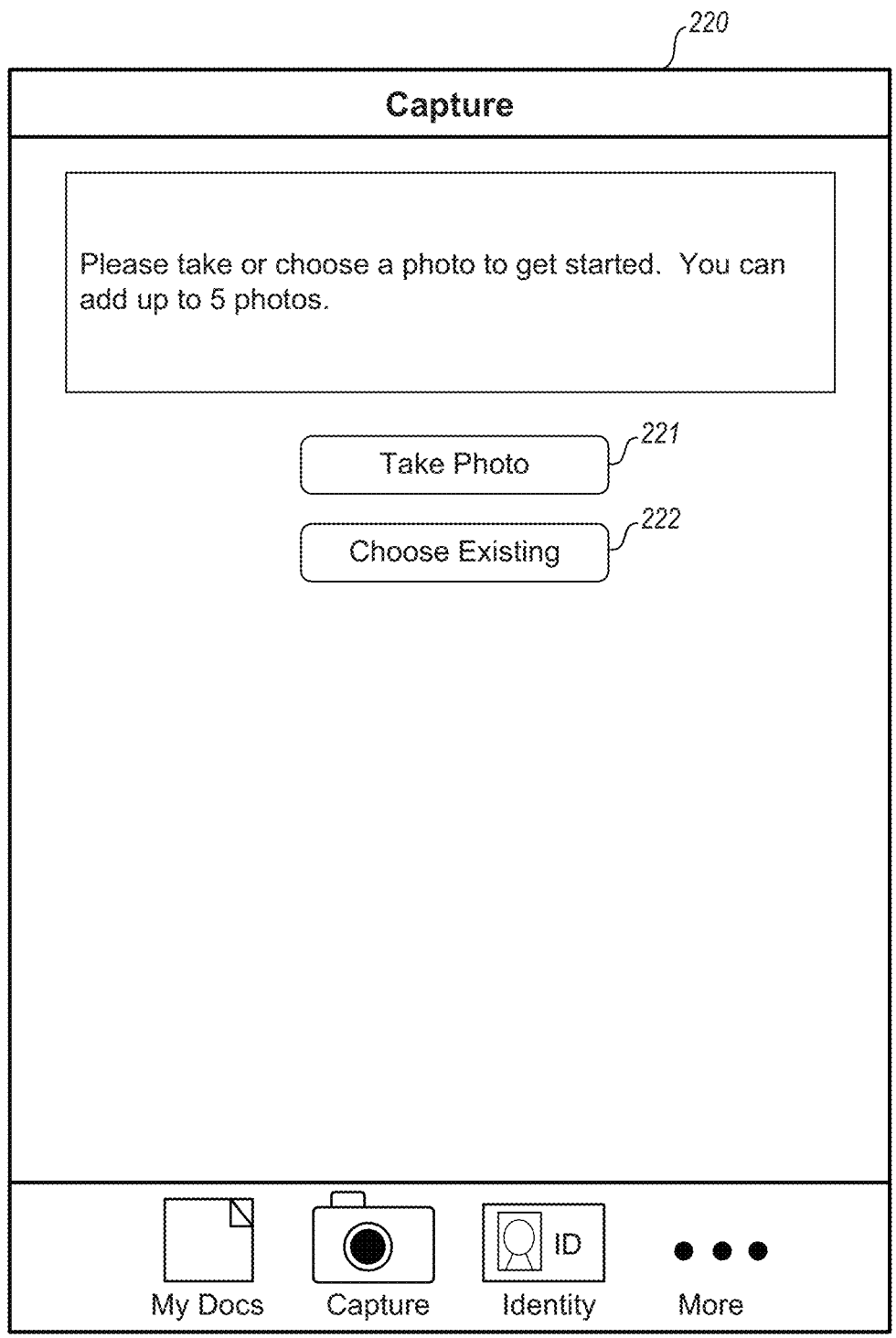

FIG. 2C illustrates an image capture screen 220. The image capture screen 220 facilitates the capture and import of an image of a paper document as described herein. The screen includes a take photo control 221 and a select existing photo control 222. Upon selection of the control 221, the signer will be presented with the user interface to the camera or other image capture device of or associated with the client device. The signer can then take one or more photos of a paper signature document.

Upon selection of the control 222, the signer will be presented with a photo browser to select one or more photos previously taken and stored on the client device. The browser may be a custom browser tailored to the signature software or a native or default photo browser provided by the client device. Once the user has captured and/or selected photos of the paper signature document, the screen 220 will display the selected photos as discussed with reference to FIG. 2D, next.

Figure 2D:
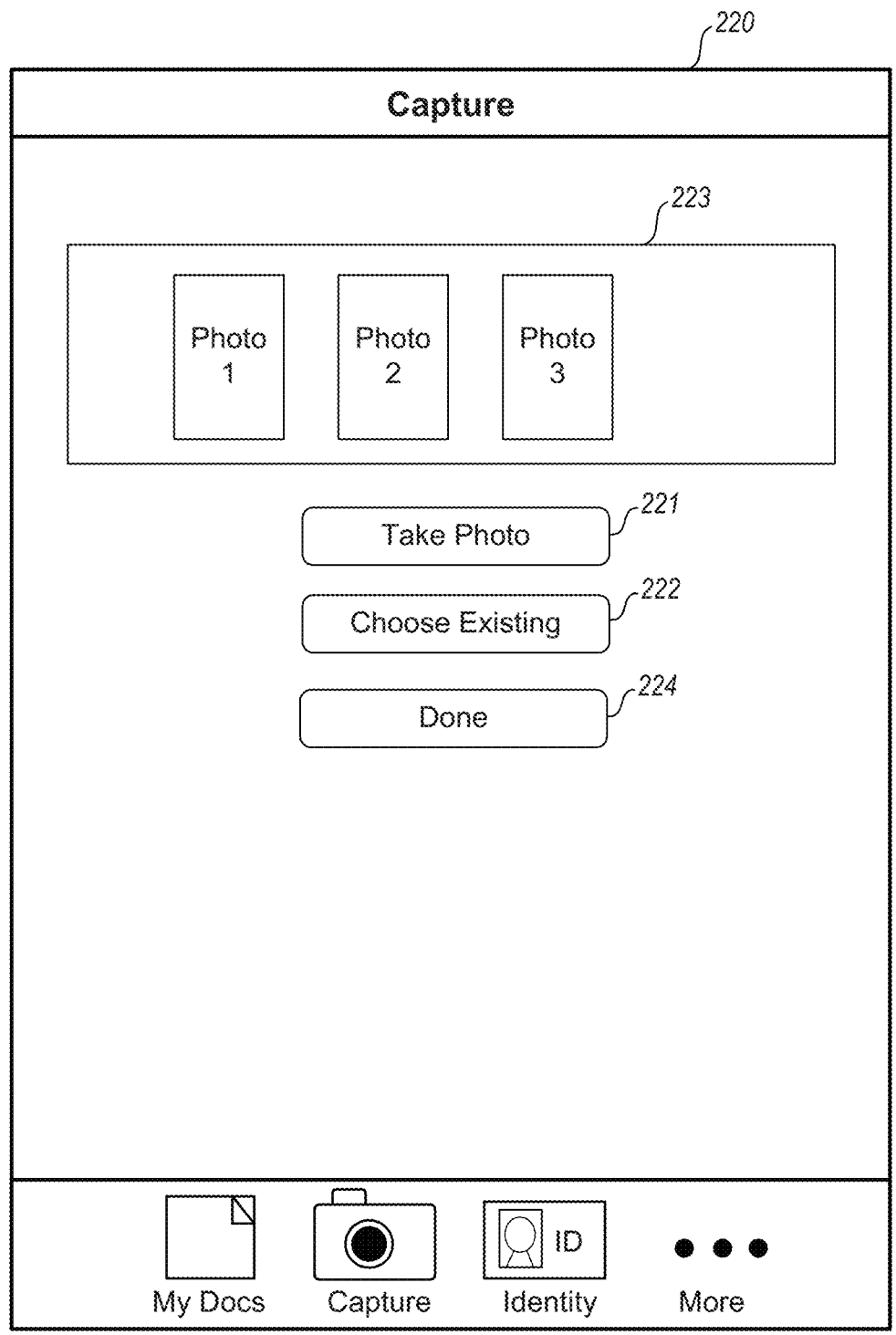

FIG. 2D illustrates the image capture screen 220 after the signer has selected one or more photos to import as an electronic signature document. The screen 220 now includes a tray control 223 which shows thumbnails of the photos selected by the signer. In this example, the signer has selected three photos, here labeled Photos 1, 2, and 3. The signer may manipulate the photos, such as by reordering, resizing, cropping, adjusting brightness or contrast, or the like. Also visible now is a completion control 224, which can be selected by the signer when he has arranged and/or manipulated the photos to his satisfaction. Upon selection of the completion control 224, the selected photos are transmitted to the ESS for secure storage as an electronic signature document. In other embodiments, the transmission of the photos may be delayed until after the signer has attached a signature, such as via a signature screen described with reference to FIG. 2E, next.

FIG. 2E illustrates a signature screen 230. The signature screen 230 is presented in response to an indication that a user desires to sign a document. For example, the screen 230 may be presented in response to a user selection of the Sign button of control 211 (FIG. 2A) or the completion control 224 (FIG. 2D).

The signature screen 230 displays a signature document 233 and includes a menu bar 231. The signature document 233 is a copy or other representation of the images captured and imported by the signer, as discussed above. The menu bar 231 includes an Add control, a Finish control, and a More Options control. The Add control, when selected, displays a menu 232 of signature elements. The signature elements include a signature, signer initials, signer name, date signed, text, and checkbox. By selecting one of the signature elements, the user/signer can insert (e.g., drag and drop) the corresponding element into the signature document 233. In this example, the signer has selected and dragged a signature element 234 onto the document 233. The signature element 234 is an active control, which can be selected (e.g., touched, clicked) by the signer to associate his signature with the document 233.

When the user has reviewed and signed the document 233, the user selects the Finish control of the menu 231. The Finish control causes a signature gathered via the signature element 234 to be securely stored in association with the document 233 by the ESS 110. The Finish control may also provide options or otherwise access functions for providing the signed document 233 to one or more recipients. For example, the Finish control may automatically invoke an email client on the signer's client device. The email client may be automatically pre-populated with a message that includes a copy of (e.g., as an attachment) and/or reference to (e.g., URL) the signed document 233.

Note that while the example of FIGS. 2A-2E are described with respect to a "signer" importing and signing a document, the illustrated scenario may include multiple distinct users. For example, a first user (an "importer") may capture an image of a paper signature document and import it as described with reference to FIGS. 2C and 2D. The importer user may then email or otherwise transmit the signature document to a second user (a "signer"), who then uses a user interface such as that shown in FIG. 2E to sign the document.

Figure 3:
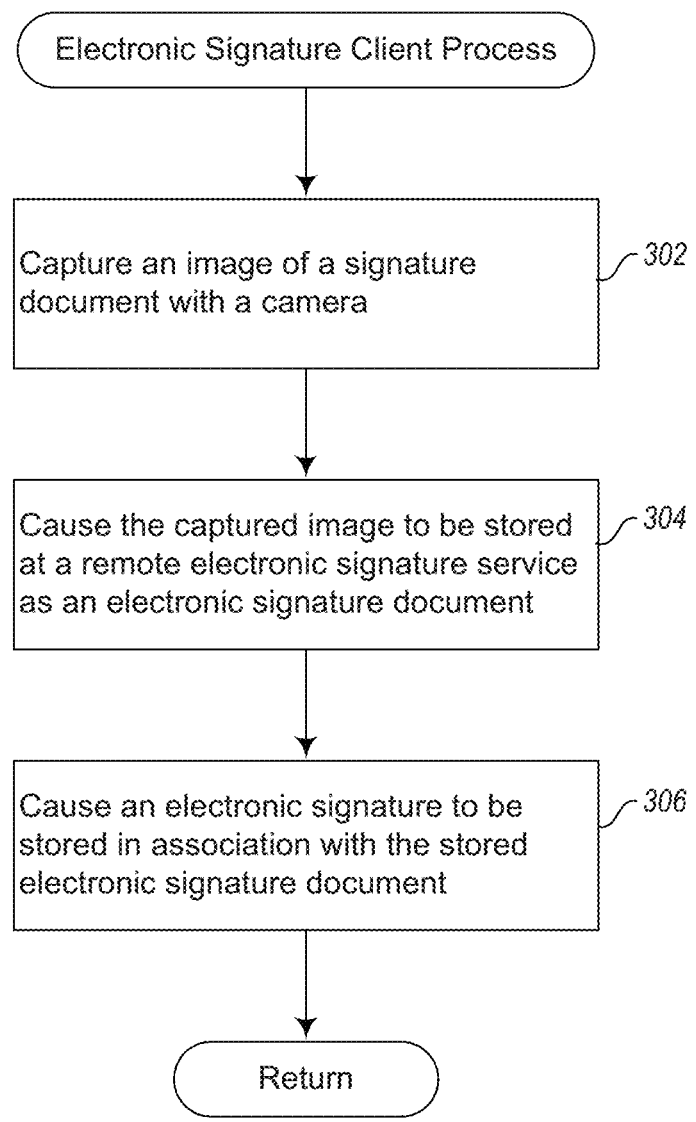
FIG. 3 is a flow diagram of an example electronic signature client process.

FIG. 3 is a flow diagram of an example electronic signature client process. The illustrated process may be performed by, for example, the logic 163 executing on the signer client device 161.

The process begins at block 302, where it captures an image of a signature document with a camera of a client device. As shown in FIG. 1, the signer client device 161 typically includes a camera 162 that is used to capture an image (e.g., take a photo) of a hard copy (e.g., paper) signature document. In other embodiments, the signer client device 161 may be coupled to a scanner, separate camera, or other image capture device that can be used to capture an image of the signature document.

At block 304, the process causes the captured image to be stored at a remote electronic signature service as an electronic signature document. The signer client device 161 includes logic 163 that uploads, imports, or otherwise transmits the captured image to the electronic signature service, where it is securely stored.

At block 306, the process causes an electronic signature to be stored in association with the stored electronic signature document. Typically, the logic 163 will be operated by the user to "attach" a signature to the document. Attaching a signature may include transmitting an indication that the user has signed (possibly along with other data, such as date, signature form, and the like) to the electronic signature service, thereby causing the electronic signature service to securely store the signer's signature in association with the document.

Figure 4:
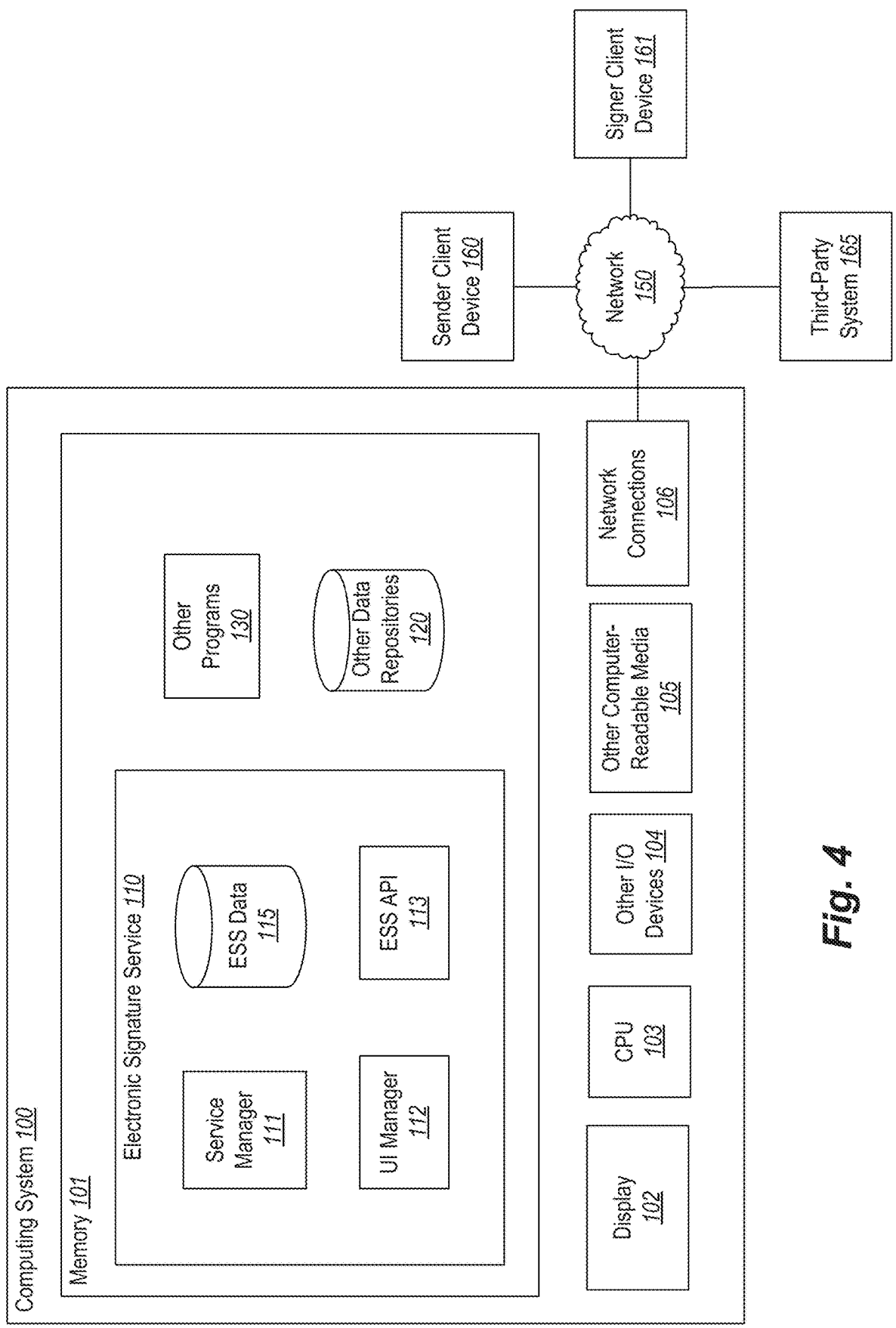
FIG. 4 is a block diagram of an example computing system for implementing an electronic signature service according to an example embodiment.

FIG. 4 is a block diagram of an example computing system for implementing an electronic signature service according to an example embodiment. In particular, FIG. 4 shows a computing system 100 that may be utilized to implement an ESS 110.

Note that one or more general purpose or special purpose computing systems/devices may be used to implement the ESS 110. In addition, the computing system 100 may comprise one or more distinct computing systems/devices and may span distributed locations. Furthermore, each block shown may represent one or more such blocks as appropriate to a specific embodiment or may be combined with other blocks. Also, the ESS 110 may be implemented in software, hardware, firmware, or in some combination to achieve the capabilities described herein. In addition, the implementation techniques described herein may also be used to implement other aspects, including the client logic 163 of the signer client device 161.

In the embodiment shown, computing system 100 comprises a computer memory ("memory") 101, a display 102, one or more Central Processing Units ("CPU") 103, Input/Output devices 104 (e.g., keyboard, mouse, CRT or LCD display, and the like), other computer-readable media 105, and network connections 106 connected to a network 150. The ESS 110 is shown residing in memory 101. In other embodiments, some portion of the contents, some or all of the components of the ESS 110 may be stored on and/or transmitted over the other computer-readable media 105. The components of the ESS 110 preferably execute on one or more CPUs 103 and facilitate mobile electronic signature processes described herein. Other code or programs 130 (e.g., an administrative interface, a Web server, and the like) and potentially other data repositories, such as data repository 120, also reside in the memory 101, and preferably execute on one or more CPUs 103. Of note, one or more of the components in FIG. 4 may not be present in any specific implementation. For example, some embodiments may not provide other computer readable media 105 or a display 102.

The ESS 110 includes a service manager 111, a user interface ("UI") manager 112, an electronic signature service application program interface ("API") 113, and an electronic signature service data store 115.

The ESS 110, via the service manager 111 and related logic, generally performs electronic signature-related functions for or on behalf of users operating a sender client device 160 and/or a signer client device 161. In one embodiment, a signer operating signer client device 161 imports (e.g., transmits, uploads, sends) a document to be electronically signed into the ESS 110. As described above, importing a document may include capturing an image of a paper document, and then transmitting the captured image from the client device 161 to the ESS 110. The ESS stores the document securely in data store 115. Secure document storage may include using cryptographic techniques to detect document tampering, such as generating hashes, message digests, or the like. The signer operating the signer client device 161 may then access, review, and sign the document stored by the ESS 110. In some embodiments, the ESS 110 transmits images or some other representation of the document to the signer client device 161, which in turn transmits an indication of the signer's signature (or intent to sign) to the ESS 110. The ESS 110 then securely stores the signer's signature in association with the document in the data store 115. After signing the document, the signer using signer client device 161 can cause the ESS 110 to provide the signed document to one or more recipients, such as via email, fax, or other mechanism.

The service manager 111 may perform other or additional functions, such as intelligent form filling as discussed above. Also, the service manager 111 may provide (e.g., transmit) code modules that can be installed on the signer client device 161 and that are configured to integrate the signer client device 161 with the ESS 110. As one example, the code module may be a mobile application (e.g., app) that is installed on the signer client device 161. As another example, the code module may extend the functionality of an email client or other application by adding a control (e.g., button, menu item, widget) that is configured to import, in response to selection or activation by a user, a received documents into the ESS 110.

The UI manager 112 provides a view and a controller that facilitate user interaction with the ESS 110 and its various components. For example, the UI manager 112 may provide interactive access to the ESS 110, such that users can upload or download documents for signature, review and modify documents, transmit or otherwise provide signed documents to recipients, and the like. In some embodiments, access to the functionality of the UI manager 112 may be provided via a Web server, possibly executing as one of the other programs 130. In such embodiments, a user operating a Web browser (or other client) executing on one of the client devices 160 or 161 can interact with the ESS 110 via the UI manager 112.

The API 113 provides programmatic access to one or more functions of the ESS 110. For example, the API 113 may provide a programmatic interface to one or more functions of the ESS 110 that may be invoked by one of the other programs 130 or some other module. In this manner, the API 113 facilitates the development of third-party software, such as user interfaces, plug-ins, news feeds, adapters (e.g., for integrating functions of the ESS 110 into Web applications), and the like. In addition, the API 113 may be in at least some embodiments invoked or otherwise accessed via remote entities, such as the third-party system 165, to access various functions of the ESS 110. For example, a hosted email service executing on the system 165 may provide access to the electronic signature functionality of the ESS 110 via the API 113. As another example, an e-commerce site (e.g., online store) executing on the system 165 may provide access to the electronic signature functionality of the ESS 110 via the API 113, such as by providing a signature control/widget configured, when selected by a user, to initiate an electronic signature process as described herein.

The data store 115 is used by the other modules of the ESS 110 to store and/or communicate information. The components of the ESS 110 use the data store 115 to record various types of information, including documents, signatures, tracked form entries, and the like. Although the components of the ESS 110 are described as communicating primarily through the data store 115, other communication mechanisms are contemplated, including message passing, function calls, pipes, sockets, shared memory, and the like.

The ESS 110 interacts via the network 150 with client devices 160 and 161, and third-party systems 165. The network 150 may be any combination of one or more media (e.g., twisted pair, coaxial, fiber optic, radio frequency), hardware (e.g., routers, switches, repeaters, transceivers), and one or more protocols (e.g., TCP/IP, UDP, Ethernet, Wi-Fi, WiMAX) that facilitate communication between remotely situated humans and/or devices. In some embodiments, the network 150 may be or include multiple distinct communication channels or mechanisms (e.g., cable-based and wireless). The client devices 160 and 161 include personal computers, laptop computers, smart phones, personal digital assistants, tablet computers, kiosk systems, and the like. The third-party systems 165 and client devices 160 and 161 may be or include computing systems and/or devices constituted in a manner similar to that of computing system 100, and thus may also include displays, CPUs, other I/O devices (e.g., a camera), network connections, or the like.

In an example embodiment, components/modules of the ESS 110 are implemented using standard programming techniques. For example, the ESS 110 may be implemented as a "native" executable running on the CPU 103, along with one or more static or dynamic libraries. In other embodiments, the ESS 110 may be implemented as instructions processed by a virtual machine that executes as one of the other programs 130. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the ESS 110, such as in the data store 118, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 118 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in certain embodiments, some or all of the components of the ESS 110 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored in a non-transitory manner on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "includes," "including," "comprises," and "comprising" should be interpreted as referring to elements, components, or steps in a non-exclusive manner, indicating that the referenced elements, components, or steps may be present, or utilized, or combined with other elements, components, or steps that are not expressly referenced. Where the written description and/or claims refer to at least one of something selected from the group consisting of A, B, C . . . and N, the text should be interpreted as requiring at least one element from the group (A, B, C N), rather than A plus N, or B plus N, etc.

All of the above-cited references, including U.S. Provisional Application No. 61/527,406, filed Aug. 25, 2011, entitled "MOBILE SOLUTION FOR SIGNING AND RETAINING THIRD-PARTY DOCUMENTS;" U.S. Provisional Application No. 61/552,359, filed Oct. 27, 2011, entitled "MOBILE SOLUTION FOR IMPORTING AND SIGNING THIRD-PARTY ELECTRONIC SIGNATURE DOCUMENTS;" and U.S. patent application Ser. No. 13/595,876, filed Aug. 27, 2012, entitled "MOBILE SOLUTION FOR SIGNING AND RETAINING THIRD-PARTY DOCUMENTS" are incorporated herein by reference in their entireties. Where a definition or use of a term in an incorporated reference is inconsistent with or contrary to the definition or use of that term provided herein, the definition or use of that term provided herein governs.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A method for facilitating electronic signatures on a client device that is operated by a signer and that is communicatively coupled to a camera, comprising:
    capturing an image of a signature document with the camera;
    displaying the image of the signature document within a user interface displayed by the client device;
    generating, in response to a request by the user of the client device, an electronic signature control within the displayed image of the signature document to receive an electronic signature of the user upon activation of the electronic signature control;
    in response to detecting activation of the electronic signature control, capturing the electronic signature of the user; and
    transmitting the image of the signature document and the electronic signature of the user to a remote electronic signature service, the remote electronic signature service configured to convert the image the signature document to an electronic signature document, and to store the electronic signature of the user in association with the electronic signature document.

2. The method of claim 1, wherein the captured image is an image of a first page of the signature document, the method further comprising:
    capturing a second image of a second page of the signature document; and
    displaying the second image of the signature document to be displayed within the user interface displayed by the client device.

3. The method of claim 2, wherein generating the electronic signature control comprises displaying the electronic signature control in association with the displayed second image.

4. The method of claim 1, further comprising receiving an identity of a second signing user from the user via the user interface and transmitting the identity of the second signing user to the remote electronic signature service, the remote electronic signature service configured to provide the electronic signature document to the second signing user.

5. The method of claim 4, wherein the received identity of the second signing user comprises an email address for the second signing user.

6. The method of claim 4, wherein providing the electronic signature document to the second signing user comprises providing a link that, when accessed, directs a device of the second signing user to the electronic signature document.

7. The method of claim 1, wherein the user interface is displayed within one of a web browser or an application running on the client device.

8. The method of claim 1, wherein the remote electronic signature service automatically populates fields of the electronic signature document based on prior form entries made by the user.

9. The method of claim 1, wherein displaying the image of the signature document within the user interface comprises displaying thumbnail images of captured images representative of the signature document and organization controls to reorder the captured images.

10. A client device configured to facilitate electronic signatures by a user, the client device comprising a camera, a hardware processor, and a non-transitory computer-readable storage medium storing executable instructions that, when executed by the hardware processor, cause the hardware processor to perform steps comprising:
    capturing an image of a signature document with the camera;
    displaying the image of the signature document within a user interface displayed by the client device;
    generating, in response to a request by the user of the client device, an electronic signature control within the displayed image of the signature document to receive an electronic signature of the user upon activation of the electronic signature control;

in response to detecting activation of the electronic signature control, capturing the electronic signature of the user; and transmitting the image of the signature document and the electronic signature of the user to a remote electronic signature service, the remote electronic signature service configured to convert the image the signature document to an electronic signature document, and to store the electronic signature of the user in association with the electronic signature document.

11. The client device of claim 10, wherein the captured image is an image of a first page of the signature document, and wherein the instructions, when executed, further cause the hardware processor to perform steps comprising:

capturing a second image of a second page of the signature document; and displaying the second image of the signature document to be displayed within the user interface displayed by the client device.

12. The client device of claim 11, wherein generating the electronic signature control comprises displaying the electronic signature control in association with the displayed second image.

13. The client device of claim 10, wherein the instructions, when executed, further cause the hardware processor to perform steps comprising: receiving an identity of a second signing user from the user via the user interface and transmitting the identity of the second signing user to the remote electronic signature service, the remote electronic signature service configured to provide the electronic signature document to the second signing user.

14. The client device of claim 13, wherein the received identity of the second signing user comprises an email address for the second signing user.

15. The client device of claim 13, wherein providing the electronic signature document to the second signing user comprises providing a link that, when accessed, directs a device of the second signing user to the electronic signature document.

16. The client device of claim 10, wherein the user interface is displayed within one of a web browser or an application running on the client device.

17. The client device of claim 10, wherein the remote electronic signature service automatically populates fields of the electronic signature document based on prior form entries made by the user.

18. The client device of claim 10, wherein displaying the image of the signature document within the user interface comprises displaying thumbnail images of captured images representative of the signature document and organization controls to reorder the captured images.

19. A non-transitory computer-readable storage medium storing executable instructions for facilitating electronic signatures, the instructions, when executed by a hardware processor of a client device, configured to cause the hardware processor to perform steps comprising:

capturing an image of a signature document with a camera;

displaying the image of the signature document within a user interface displayed by the client device;

generating, in response to a request by a user of the client device, an electronic signature control within the displayed image of the signature document to receive an electronic signature of the user upon activation of the electronic signature control;

in response to detecting activation of the electronic signature control, capturing the electronic signature of the user; and transmitting the image of the signature document and the electronic signature of the user to a remote electronic signature service, the remote electronic signature service configured to convert the image the signature document to an electronic signature document, and to store the electronic signature of the user in association with the electronic signature document.

20. The non-transitory computer-readable storage medium of claim 19, wherein displaying the image of the signature document within the user interface comprises displaying thumbnail images of captured images representative of the signature document and organization controls to reorder the captured images.

* * * * *